200# United States Patent Office 2,861,397
Patented Nov. 25, 1958

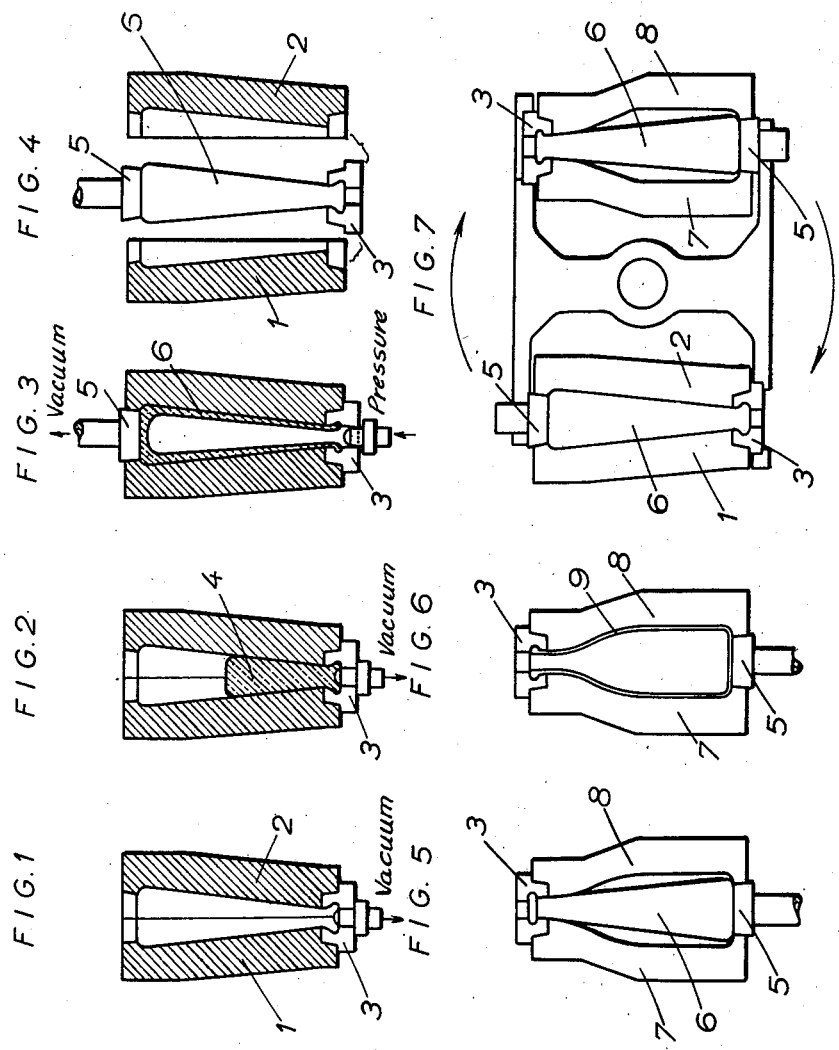

2,861,397

METHOD FOR THE MANUFACTURE OF HOLLOW GLASS-WARE

Pierre Paul Morel, Reims, France, assignor to Verreries Mecaniques Champenoises, Reims (Marne), France, a corporation of France Application October 4, 1954, Serial No. 460,219

Claims priority, application France October 10, 1953

1 Claim. (Cl. 49—80)

This invention relates to the mechanical manufacture of hollow glass-ware, such as bottles, jars or the like. More particularly, it relates to a shaping process starting from a drop of glass which makes it possible to obtain products, more uniform than similar products obtained by the methods known in the art, which comprise the successive use of a roughing mold and a finishing mold.

In these processes, the transfer of the rough product, called lump, into the finishing mold is effected by suspending this lump either by the neck or the bottom.

In both instances, serious drawbacks are encountered in rotary machines as well as in stationary machines.

Actually, in the first instance, since the lump is suspended by its neck, the lower portion of the lump adapted to form the bottom of the product, is not maintained, and in rotary machines this lower portion is often subjected to the successive influences of the centrifugal forces created by the rotation of the plate and the momentum forces which come into action when the plate is brought to a standstill.

Furthermore, when the machine is at a standstill, though the lump introduced into the finishing mold tends to again assume a vertical position, since the plate of the finishing mold is put into motion, the same forces as hereinabove noted are created and cause variations in the thickness of the bottom of the object as well as in the vertical portions extending from said bottom.

If a stationary machine is used, the transfer of the lump includes a semi-rotation of this rough product about a horizontal axis, and since the lump is held merely by the neck ring mold, this results in the bottom of the lump being subjected to centrifugal and momentum forces proportionate to the length of the lump, blank or parison the effect of which is all the more noticeable as the manufacture requires the use of a hotter and, therefore, less rigid glass. It was endeavoured, of course, to minimize these centrifugal and momentum forces by a suitable kinematic organisation of the machine, but, on one hand, these forces cannot be abolished, and on the other hand, the convenience and simplicity are sacrificed in this research.

In the second case, namely bottom suspension, the lump adheres to the bottom of the rough mold formed for example into a vacuum cup. The upper end, i. e. the neck, is free and, by reason of the unavoidable deformations due to kinematics of the transfer, this neck seats more or less inaccurately in the finishing mold and, finally, generally remains out of center with respect to the axis of the bottom. In order to obviate this drawback within possible limits, it is essential to permit the lump to cool sufficiently prior to the transfer so that it is more rigid and warms up in the finishing mold in order to make the completion of the moulding operation possible, with a resultant loss of time and heat, or to put the lump upright by making it slide against an incline in the course of the transfer thereby running the risk of the deformation of the neck.

The object of the present invention is to obviate or at least to substantially minimize all the drawbacks hereinabove mentioned, and it is mainly characterized by the fact that, during the transfer, the lump is maintained in two regions, preferably as remote from each other as possible, such as for instance the neck and the bottom, without any marked previous cooling. The invention contemplates carrying out this double backing during a time equal at least to that of the transfer and also, if it is desired, after the transfer is completed, so that there is no likelihood of the lump being deformed by a centrifugal or momentum effect, by reason of a lack of rigidity thereof.

The advantages gained by such a type of transfer are time and heat saving, great regularity in the shape of the narrow mouth and the neck and in their axial position with respect to the axis of the bottom, and also a better distribution of the material which enhances the obtainment of great regularity in the thickness of the bottom and of the vertical portions extending from the bottom.

The invention will be readily understood with reference to the accompanying drawing in which Fig. 1 is a longitudinal section of a mold for carrying out the method in accordance with the present invention.

Figs. 2 to 6 are similar views illustrating successive steps of the method.

Fig. 7 is a schematic vertical section of a machine for carrying out the method and illustrating the inversion of the mold.

It should be understood that the following description relates merely to one example of an application of the principle according to the invention and that the choice of this example should in no way be interpreted as restrictive for the scope of the invention.

Fig. 1 illustrates an empty roughing mold ready to be loaded. This mold is constituted by two identical half shells 1, 2 the separation of which is visible in Fig. 4.

The mold is obturated in its lower portion by a ring or neck mold 3 with a core connected to a pipe subjected to either vacuum or compressed air.

A "drop" or gather of molten glass 4 is introduced into the roughing mold through the open upper portion thereof and vacuum is applied to the aforesaid pipe. The drop flows down and fills up the recesses of the ring mold (Fig. 2). At this moment, the vacuum is suppressed and the port of the mold is obturated by means of a cover 5 the lower portion of which corresponds, at least in part, to the outline of the finished product, and furthermore is perforated with a great number of tiny pipes opening into a chamber contained in said cover and communicating with a pipe adapted to be subjected to a vacuum.

Compressed air is then forced into the pipe leading to the ring mold 3, which blows the glass and forces it against the whole area of the inner walls of the roughing mold (Fig. 3).

At this moment the compressed air is cut-off, the pipe leading to the roughing cover is put under vacuum and the roughing mold is opened.

The blank or parison 6 is maintained by the vacuum cup cover 5 and the ring mold 3 (Fig. 4).

This vacuum cup cover and ring mold form parts of a mechanical assembly which, by virtue of a suitable kinematic organization, turns the blank or parison 6 upside down in such a manner that when the axis thereof again assumes a vertical position, the neck is then located at the upper portion and the vacuum cup cover holds the blank or parison by the bottom thereof.

Two finishing half-shells 7, 8 are then brought into embracing relationship with the blank or parison 6 while fitting against the ring mold 3 and the vacuum cup cover 5 which becomes the bottom of the finishing mold, there-after the blowing of the bottle 9 is completed (Figs. 5 and 6).

The thickness of the walls of the products thus transferred is much more regular than that of the products which are manufactured according to any of the methods of the prior art hereinabove mentioned.

On the other hand, if a high production manufacture is contemplated, it is sufficient to provide a machine in which the roughing mold and the finishing mold operate simultaneously.

Fig. 7 diagrammatically illustrates one embodiment of a machine that fulfils this requirement.

In this figure the roughing mold is on the left and the finishing mold on the right.

It will be readily understood that during the time when the drop of glass falls into the roughing mold, a blank or parison is being completed in the right-hand side mold. The applications of vacuum and the blowings are so timed that the opening of the two molds occur simultaneously. Immediately after such opening, the transfer is effected and, simultaneously, the ring mold and the bottom which assumed the finishing position are restored to the roughing position and the cycle begins again.

Such a high efficiency type of transfer is applicable, not only to a stationary machine, but also to a rotary machine which, of course, is comprised of a plurality of similar units adapted to operate successively in the manner hereinabove indicated.

In the examples just described, it has been assumed that the length of the blank was the same as that of the finished product. In some particular manufactures, however, it is advantageous that the blank be slightly stretched, which greatly enhances the equalisation of the temperature and the regularity in the thickness of the walls determining the appearance and quality of the product. In such case, it is sufficient, on the one hand, to maintain the double grip only up to the moment when centrifugal or momentum effects are no longer to be feared, and, on the other hand, after having ceased applying the vacuum upon the vacuum cup cover which now is the lower support for the blank, slightly to lower this part prior to the finishing half-shells being put into place, said part either still constituting the bottom of the finishing mold or being replaced by another suitable part.

The blank remains suspended vertically from the ring mold even prior to the closing of the finishing mold and is stretched without any deformation to be feared. The regularity of the product is hence improved to a still greater extent.

As many changes could be made in the above method and construction without departing from the scope of the claim, it is intended that all matter contained in the above description or shown in the accompanying drawings shall be interpreted as illustrative and not in a limiting sense.

What I claim is:

The method of forming an article of hollow glassware which comprises, charging an inverted roughing mold and associated neck mold with a gather of molten glass through an upper opening provided in said roughing mold, engaging a vacuum cup cover in the upper opening of said roughing mold, applying a vacuum through the neck mold cooperating with said roughing mold thereby to draw the glass gather well into the bottom toward said neck mold and forming the neck of the article, breaking the vacuum and applying air pressure through the neck mold to blow the molten glass into a blank conforming to the roughing mold cavity, removing the blank from said roughing mold while holding it between the vacuum cup cover and neck mold and rotating the blank half-a-turn while transporting it into an upright finishing mold having an upper opening receiving the neck mold and a lower opening receiving the vacuum cup cover, applying air pressure through the neck mold while engaged in the finishing mold to make the blank conform to the cavity of the finishing mold and thereby finish the article.

References Cited in the file of this patent

UNITED STATES PATENTS

| | | |
|---|---|---|
| 1,148,701 | Mackin | Aug. 4, 1915 |
| 2,063,463 | Rowe | Dec. 8, 1936 |